J. H. DOLBY.
SELF OPERATING CAMERA SHUTTER.
APPLICATION FILED DEC. 11, 1916.

1,249,351.

Patented Dec. 11, 1917.

Inventor:
Jesse H. Dolby.
his Attorneys

UNITED STATES PATENT OFFICE.

JESSE H. DOLBY, OF ELGIN, ILLINOIS.

SELF-OPERATING CAMERA-SHUTTER.

1,249,351.  Specification of Letters Patent.  Patented Dec. 11, 1917.

Application filed December 11, 1916. Serial No. 136,300.

*To all whom it may concern:*

Be it known that I, JESSE H. DOLBY, a subject of the King of Great Britain, residing at Elgin, in the county of Kane and State of Illinois, have invented certain new and useful Improvements in Self-Operating Camera-Shutters, of which the following is a specification.

My invention in the present instance pertains to improvements in photographic cameras, and particularly to their shutter mechanism. Specifically, my improvements relate to the shutter operating features disclosed in Letters Patent No. 1,084,137, for a camera shutter, issued to me January 13, 1914. In my prior patent I have described means for setting and operating a camera shutter which were combined with or formed a part of the camera. In this application I am endeavoring to cover a shutter, and automatic means for operating same, which constitute a unitary device or attachment capable of being operatively connected with any type of camera of commerce, by the owner of the camera, without tools or mechanical skill, and which may be readily removed from the camera when its use is not required.

One of the objects of my improvements is to provide a combined shutter and gravity motor, which may be instantly attached to and removed from cameras of either the box type or the folding or telescoping style.

Another object of my invention is to provide an attachable and detachable self-operating auxiliary shutter which can be regulated as to speed by simple adjustments, and which can be controlled as to the time at which the shutter will start to operate.

A further object of my invention is to provide a shutter-operating motor of simple and economical construction which will be fool-proof and weather-proof, and remain unaffected by atmospheric changes.

In carrying out the foregoing special objects and others of general utility, such as convenience of use, durability, and cheapness in price, I have provided an automatic shutter which is practically integral with or part of its operating motor, and which, with a cylindrical casing and speed attachments, comprises the complete device, which will be hereinafter described in detail.

In the accompanying drawing, I have shown a preferred embodiment of my invention in the following views:—

Referring to the details of the drawings, A represents a cylindrical cap of thin metal proportioned to embrace the lens barrel of a camera. From opposite edges of the upper segment of the casing extend small perforated lugs, $5^a$, in which are journaled the ends of a suitable horizontally disposed shaft, 7. Secured to the forwardly extended end of this shaft is the shutter and shutter-motor, which preferably consist of an hour-glass shaped casing, 8, and a plate, $8^b$, which is of dumb-bell shape, the lobes of which extend laterally beyond the sides, $8^a$, of the casing and constitute the shutter-member proper and also form the inner wall or back of casing, 8, also serving as covers for the outer open end of cap A. One of the pear-shaped divisions of the outer wall of the motor-casing, 8, is provided with a panel, $8^e$, indicated thereon by paint or otherwise, in order to differentiate it from the corresponding opposite section, while along one edge of the latter section is placed an arrow, $8^d$. These two sections of the motor casing are joined by means of a narrow neck, the opposite walls of which are slightly expanded as at $8^c$, to provide recesses into which a small transverse diaphragm or plate, 9, is seated to divide the casing into two chambers that communicate with each other through an orifice, $9^a$, made in the central portion of said plate, 9.

Within the chamber of the casing identified by the panel, $8^e$, is a suitable weight, 12, which is disposed adjacent one wall near the outer end of the chamber. To the exterior of the other chamber and substantially diametrically opposite the weight, 12, is an adjustable weight, 13, the adjustment thereof being effected by a screw, 14, secured in lugs, 14ª, projecting laterally from the edge of the motor casing, which screw passes through the weight so that the turning of the latter will cause the weight to travel along the same, thus increasing or diminishing the distance of the weight from the axis of the motor casing, so as to modify the speed at which said motor will actuate the shutter. It is obvious, however, that other means for adjusting the weight may be employed which it is not necessary to illustrate or describe in detail herein.

At the diametrically opposite ends of the motor casing are lugs, 8ᶠ, which are adapted to engage an L-shaped stop, 8ᵍ, fixed on the periphery of cap A, the engagement being frictional and adapted to prevent the shutter rebounding from the impetus gained by gravity acting on the over-balanced motor. I prefer to place in the motor chambers, sand or other similar fine granular material of suitable specific gravity so as not to preponderate the weight, 12.

Figure 1:
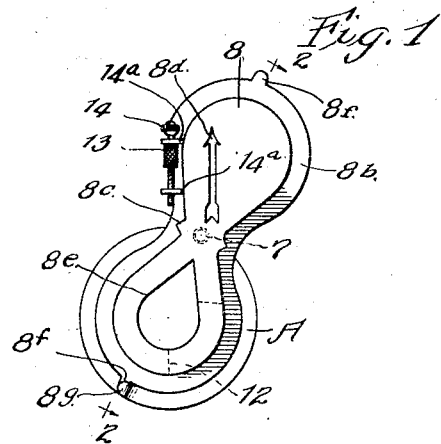
Figure 1 is a front elevation of my improved shutter attachment.
Figure 2:
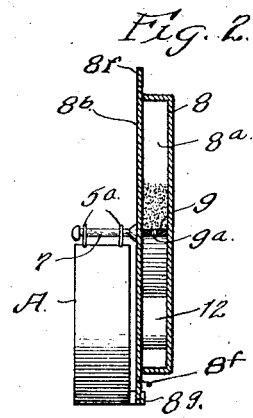
Fig. 2 is a longitudinal section taken on line 2—2, Fig. 1.
Figure 3:
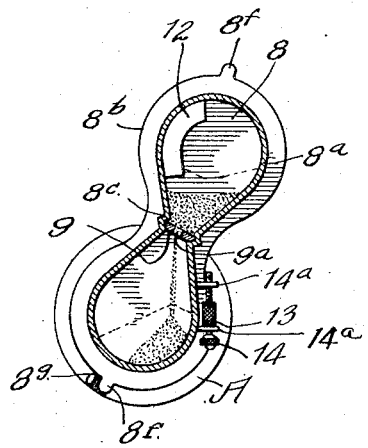
Fig. 3 is a sectional and partially diagrammatic view of the attachment with the front plate removed to disclose the relative location of the parts when the shutter is in "set" position.
Figure 4:
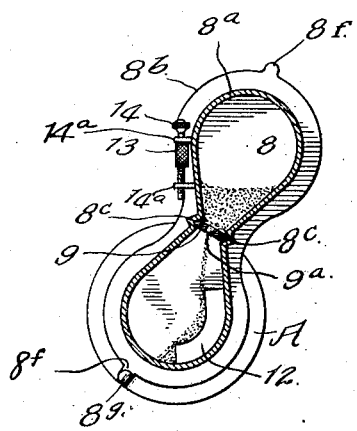
Fig. 4 is a view similar to Fig. 3, showing the relative location of the parts immediately after the shutter has been operated.

In using my attachment, when the operator desires to be included in the scene or group to be photographed, he will place the cap, A, on the forward end of the lens barrel so that the arrow, 8ᵈ, will stand vertically, as indicated in Fig. 1 of the drawings, in which position the sand will flow down through the orifice, 9ª, into the lower or panel chamber. Upon the emptying of the upper or arrow chamber, the operator will then turn the attachment upon its axis to the reverse position (Fig. 1) in which position the arrow chamber will cover the adjacent or outer opening of the cap, A, and incidentally close the lens barrel of the camera. The center of gravity of the chamber then filled with sand will be upon the right-hand side (looking into the lens) of the vertical plane of the shaft, 7, upon which the device rotates, and the empty chamber will lie below and to the left-hand side of the vertical plane of said shaft. The sand gravitating into the empty lower chamber, 8, on the left of the vertical plane of the axis, will cause the center of gravity of the device to shift to the left of the vertical plane of the axis, thereby causing the weight, 12, which preponderates the weight of the sand, to gravitate about the pivotal axis to the lower position.

It will be understood that as soon as the attachment has been adjusted, the ordinary camera shutter may be opened by any of the usual means provided therefor, and the operator will then have ample time to pose himself within the camera range.

What I claim as new and desire to secure by Letters Patent is:—

1. A device adapted to be readily attached to and detached from a photographic camera, and comprising attaching means having a lens exposing opening therein and a combined shutter and gravity operating motor mounted on said attaching means.

2. A device adapted to be readily attached to and detached from the lens hood of a photographic camera, and comprising means adapted to engage said lens hood and having a lens exposing opening therein, and a combined shutter and gavity operating motor mounted on said hood engaging means.

3. A device adapted to be readily attached to and detached from the lens hood of a photographic camera, and comprising means adapted to engage said lens hood, a combined shutter and gravity acting motor on said hood engaging means, and means for regulating the speed at which said shutter motor operates.

4. An attachment for photographic cameras consisting of a rotatable shutter, a motor forming a part of said shutter and adapted to automatically shift the center of gravity of said shutter.

5. An attachment for photographic cameras consisting of a rotatable shutter, a motor on said shutter adapted to shift the center of gravity of said shutter and adjustable means for controlling the speed at which said shutter rotates.

6. An attachment for photographic cameras, consisting of a rotatable shutter, a motor on said shutter adapted to automatically shift the center of gravity of said shutter, and means for controlling the speed at which said shutter rotates, said means adapted to take effect only after the shutter has reached a certain position in its travel.

7. An attachment for cameras, consisting of a detachable collar having a lens exposing opening therein, a shutter rotatably mounted on said collar, a gravity acting motor forming a part of said shutter, means for regulating the speed at which said shutter is moved by said motor, and means for indicating the correct operative position of said motor.

Signed at Chicago, county of Cook, and State of Illinois, this 4th day of December, 1916.

JESSE H. DOLBY.

Witnesses:
 E. K. LUNDY, Jr.,
 H. SLACK.

Copies of this patent may be obtained for five cents each, by addressing the "Commissioner of Patents, Washington, D. C."